US012733053B2

(12) United States Patent
Anklesaria et al.

(10) Patent No.: US 12,733,053 B2
(45) Date of Patent: Sep. 8, 2026

(54) APPLICATION LINE SELECTION FOR MULTI-SIM DEVICES

(71) Applicant: Verizon Patent and Licensing Inc., Basking Ridge, NJ (US)

(72) Inventors: Hitesh A. Anklesaria, Monroe, NJ (US); Praveen Venkataramu, Raritan, NJ (US); John M. Stokes, Yorba Linda, CA (US); Mun Wei Low, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 18/422,135

(22) Filed: Jan. 25, 2024

(65) Prior Publication Data

US 2025/0247906 A1 Jul. 31, 2025

(51) Int. Cl.
*H04W 76/15* (2018.01)
*H04W 8/18* (2009.01)
*H04W 84/04* (2009.01)

(52) U.S. Cl.
CPC ........... *H04W 76/15* (2018.02); *H04W 8/183* (2013.01); *H04W 8/186* (2013.01); *H04W 84/042* (2013.01)

(58) Field of Classification Search
CPC ..... H04W 76/15; H04W 8/183; H04W 8/186; H04W 84/042
See application file for complete search history.

(56) References Cited

U.S. PATENT DOCUMENTS

2023/0164541 A1* 5/2023 Ravikanti ............ H04W 8/183 455/558
2023/0328505 A1* 10/2023 Dutta ...................... H04W 4/50 455/418

* cited by examiner

*Primary Examiner* — Kyaw Z Soe

(57) ABSTRACT

Systems and methods described herein enable association of an application with a line of service on Dual SIM Dual Standby (DSDS) devices. A user equipment (UE) device receives a command to execute an application that requires a mobile network connection. The UE device detects multiple available subscriber identity modules (SIMs), wherein each of the multiple available SIMs is associated with a different line of service. The UE device extracts an application identifier for the application, and determines, based on the application identifier, that the application is associated with a designated line of service. The UE devices initiates a session connection request for the application using a SIM, of the multiple available SIMs, associated with the designated line of service.

20 Claims, 13 Drawing Sheets

APPLICATION LINE SELECTION FOR MULTI-SIM DEVICES

BACKGROUND INFORMATION

Service providers, network providers, and other types of entities may manage the allocation and assignment of subscriber identity module (SIM) cards and/or other types of cards to end devices for use in accessing various networks and application services. End devices may have multiple SIMs that can each support a different line of service. Dual SIM Dual Standby (DSDS) devices, for example, have the capability to have two lines of service active at the same time. Embedded SIMs (eSIMs) may be a practical alternative to traditional removable SIM cards containing subscription credentials. With the advent of eSIM, the adoption of DSDS devices is increasing.

DETAILED DESCRIPTION

The following detailed description refers to the accompanying drawings. The same reference numbers in different drawings may identify the same or similar elements. Also, the following detailed description does not limit the invention.

Some User Equipment (UE) devices with multiple SIMs, such as DSDS devices, allow end users to associate communication sessions with different lines of service, which may be associated with different phone numbers and/or different service providers. For example, a user may talk on one line while browsing data via the second line. Users can select which line will carry voice, text messages, and/or data by default or change an association in real time via a user interface on the UE device, for example.

The flexibility of DSDS devices can present a challenge for enterprises that want to ensure that all communications (e.g., data, voice, applications) relating to the enterprise are transmitted over a secure line or data connection. DSDS devices with two lines of service (e.g., business and personal lines, public network and private network lines, or any other combinations) are not able to distinguish which line of service needs to be used for which type of user profile.

Systems and methods described herein allow applications to be assigned to specific lines of service at the user or telephony manager level without the need for separate mobile device management software. In one implementation, an end user may designate an application to use a designated line of a DSDS device. In another implementation, a Mobile Device Management (MDM) system may be used to store administrators' preferences of line selection for enterprise applications.

Figure 1:
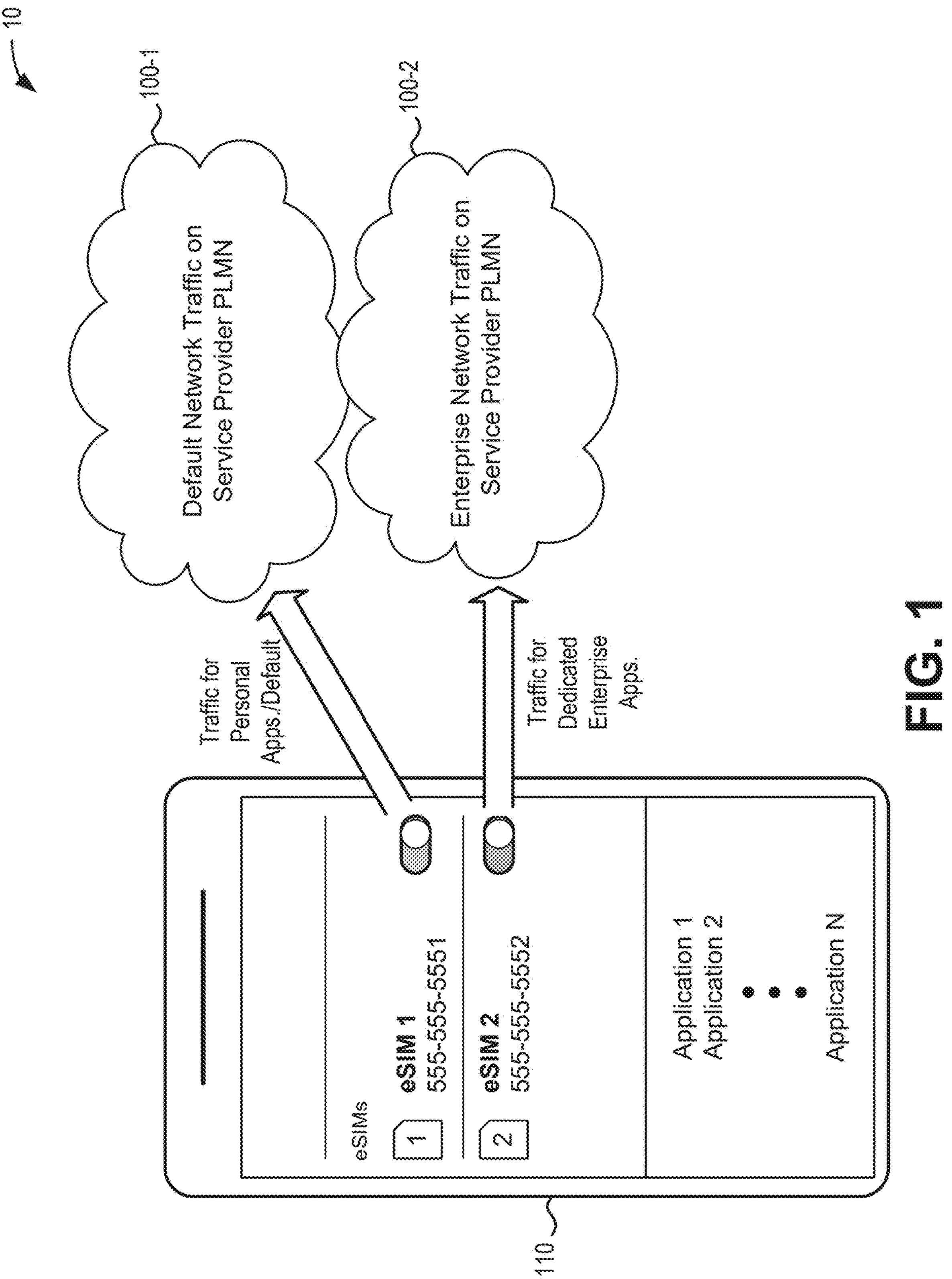
FIG. 1 is a diagram illustrating concepts described herein.

FIG. 1 illustrates concepts described herein. A system 10 may include a UE device 110 (also referred to herein as UE 110) configured as a DSDS device with first eSIM ("eSIM 1") and a second eSIM ("eSIM 2"). System 10 may also include a mobile network 100-1 associated with eSIM 1 and another mobile network 100-2 associated with eSIM 2.

Each of mobile networks 100-1 and 100-2 (referred to collectively as mobile networks 100 or generically as mobile network 100) may support a different line of service (e.g., associated with eSIM 1 or eSIM 2) for UE device 110. Each mobile network 100 may include a public land mobile network (PLMN) and possibly one or more other networks (not shown in FIG. 1) that provide wireless (e.g., Radio Frequency (RF)) communication with UE 110. For example, each mobile network 100 may be composed of sub-networks, such as a radio access network (RAN) and a core network, as described further herein. In one implementation, mobile network 100-1 may be a macro network associated with national or regional mobile network operator (MNO) and mobile network 100-2 may be a private network associated with an enterprise. Although shown as separate PLMNs in FIG. 1, in other implementations, mobile networks 100-1 and 100-2 may be the same PLMN supporting different lines of service associated with eSIM 1 and eSIM 2. In other implementations, system 10 may include additional mobile networks 100. UE 110 may be configured with multiple eSIMs, such as eSIM 1 and eSIM 2 illustrated on the user interface of UE 110. Each of eSIM 1 and eSIM 2 may be associated with a different line of service (e.g., 555-555-5551 and 555-555-5552, respectively). UE 110 may subscribe to different lines of service with the same or different service providers. For example, a user's subscription for line 555-555-5551 may be intended for a typical service and data plan for general or personal use, while a user's subscription for line 555-555-5552 be intended for a traffic associated with an enterprise or enterprise applications.

UE device 110 may also be configured with multiple applications (e.g., "Application 1," "Application 2," etc.). When an application is launched or executed on UE 110 for the first time, UE 110 may detect the application ID and determine if the application ID is already associated with a particular line of service (e.g., eSIM 1 or eSIM 2). For example, an application/eSIM association may be stored from previous administrator input, as described further herein. In one implementation, if there is no known eSIM association for the application, UE device 110 may prompt the user to assign the application to a line associated with eSIM 1 or eSIM 2. If UE device 110 already has stored eSIM association for the application, UE device 110 may detect the application/eSIM association and direct a communication session for the application over the designated eSIM.

Figure 2:
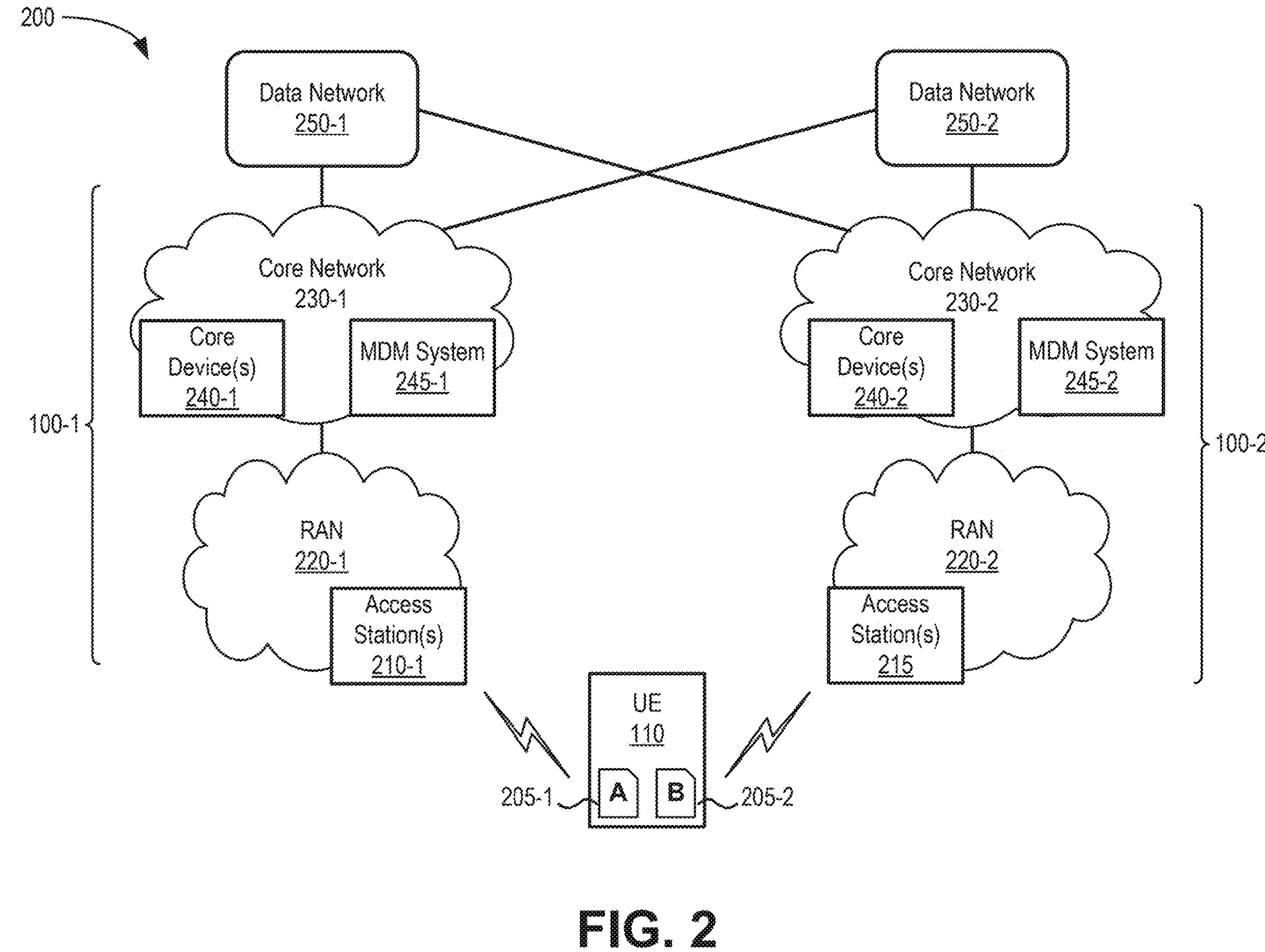
FIG. 2 illustrates an example network environment in which systems and methods described herein may be implemented.

FIG. 2 is simplified diagram of a network environment 200 in which systems and methods described herein may be implemented. As shown in FIG. 2, environment 200 may include UE 110, mobile network 100-1, and mobile network 100-2. Mobile network 100-1 may include a RAN 220-1 and a core network 230-1. Mobile network 100-2 may include a RAN 220-2 and a core network 230-2. Network environment 200 may also include one or more data networks 250-1, 250-2, etc.

UE device 110 may include any device with wireless communication functionality (e.g., cellular or mobile wireless network) that supports DSDS capability. For example, UE device 110 may include a handheld wireless communication device (e.g., a mobile phone, a smart phone, a tablet device, etc.) and/or any other type of computer device with wireless communication and DSDS capabilities. UE device 110 may include capabilities for voice communication, mobile broadband services (e.g., video streaming, real-time gaming, premium Internet access etc.), enterprise-specific applications (e.g., business applications, communication applications, timekeeping applications, etc.), best effort data traffic, and/or other types of applications. Using eSIMs, UE device 110 may be provisioned with different network credentials (e.g., different international mobile subscriber identifiers (IMSIs)) to access different lines of service and/or mobile networks 100.

UE 110 may be registered with network 100-1 and include an eSIM 205-1, illustrated as eSIM A in FIG. 2, for network access. The eSIM may store a user (or a subscriber) credentials associated with accessing network 100-1. Furthermore, to enable UE 110 to receive services via a separate line of service and/or from other networks (e.g., network 100-2), UE 110 may also include a separate eSIM 205-2, illustrated as eSIM B in FIG. 2, with credentials for accessing network 100-2. While implementations described here illustrate a DSDS device using multiple eSIMs, in other implementations, UE device 110 may use Universal Integrated Circuit Cards (UICCs) within a secure element (SE) and/or integrated SIMs (iSIMs) instead of eSIMs to implement DSDS functionality.

Mobile network 100-1 may be associated with a MNO or service provider. Mobile network 100-1 may include RAN 220-1 with one or more access stations 210-1 and core network 230-1 with one or more core devices 240-1. RAN 220-1 may allow UE 110 to access core network 230-1. To do so, RAN 220-1 may establish and maintain, with participation from UE 110, an over-the-air channel with UE 110 and maintain backhaul channels with core network 230-1. RAN 220-1 may convey information through these channels, from UE 110 to core network 230 and vice versa.

RAN 220-1 may include a Long-Term Evolution (LTE) radio network, a Next Generation (NG) RAN (e.g., Fifth Generation (5G) radio access network), and/or another advanced radio network. These radio networks may operate in many different frequency ranges, including millimeter wave (mmWave) frequencies, sub 6 GHz frequencies, and/or other frequencies. RAN 220-1 may include multiple base stations (e.g., eNodeBs, gNodeBs, or other base stations), Central Units (CUs), Distributed Units (DUs), Radio Units (RUs), and/or Integrated Access and Backhaul (IAB) nodes, referred to collectively herein as access stations 210-1. Access station 210-1 may establish and maintain over-the-air channels with UEs 110 and backhaul channels with core network 230-1.

Core network 230-1 may include one or multiple networks of one or multiple network types and technologies. For example, core network 230-1 may be implemented to include a Next Generation Core (NGC or 5GC) network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network. Core network 230 may allow the delivery of Internet Protocol (IP) services to UE 110 and may interface with other networks, such as data network 250.

Core network 230-1 may include various core devices 240-1. Depending on the implementation, core devices 240-1 may include 5G core network components (Unified Data Management (UDM) function, an Access and Mobility Management Function (AMF), an Authentication Server Function (AUSF), and a Unified Data Repository (UDR), etc.) and/or 4G core network components (e.g., a Serving Gateway (SGW), a Packet data network Gateway (PGW), a Mobility Management Entity (MME), a Home Subscriber Server (HSS), an Authentication Authorization and Accounting (AAA) server, a Policy and Charging Rules Function (PCRF), etc.). Core devices 240-1 may also include other 4G and/or 5G core network components, including combined 4G/5G network components. According to an embodiment, core network 230-1 may include some or all of a Mobile Device Management (MDM) system, as described herein.

Components of mobile network 100-1 may be associated with a service provider to provides access to subscribers. MDM system 245-1 may include one or more computing devices or systems that act as a backend for mobile network 100-1. For example, MDM system 245-1 may include one or more devices configured for creation, download, remote management (e.g., enable, disable, update, delete), and/or security of MNO credentials (e.g., a SIM profile). MDM system 245-1 may include a database that is configured to store records of eSIM profiles associated with UEs 110. Depending on the implementation, MDM system 245-1 may be hosted on other portions of mobile network 100-1, such as data network 250-1, RAN 220-1, or a Multi-access Edge Computing (MEC) network.

In one implementation, mobile network 100-2 may include a PLMN associated with a different MNO than mobile network 100-1. In another implementation, mobile network 100-1 and mobile network 100-2 may be part of the same network but support different service lines for UE device 110. If a separate network, mobile network 100-2 may include a RAN 220-2 and a core network 230-2. RAN 220-2 and core network 230-2 may include components similar to those described above in connection with RAN 220-1 and a core network 230-1. For example, RAN 220-2 may include one or more access stations 210-2 that support an LTE radio network, a NG RAN, and/or another advanced radio network. Core network 230-2 may include core devices 240-2. Similar to core devices 240-1 described above, core devices 240-2 may include core network components, including 4G or 5G core network components, future generation components and/or combined network components. Mobile network 100-2 may further include a MDM system 245-2 that, in a manner similar to MDM system 245-1, manages eSIMs and eSIM profiles for mobile network 100-2. Mobile network 100-2 may also include additional components that are not shown in FIG. 2 for simplicity.

In some implementations, mobile network 100-2 may have an overlapping coverage area (e.g., regional, national, international) with mobile network 100-1. For example, access stations 210-2 of mobile network 100-2 may provide numerous overlapping cells (or coverage areas) with mobile network 100-1. Thus, while RAN 220-1 and RAN 220-2 are shown separately in FIG. 2, in many geographic areas, coverage of RAN 220-1 may overlap coverage of RAN 220-2. However, mobile network 100-1 and mobile network

100-2 may provide different levels of services, security, and/or access. As examples, an application being used on UE device 110 may be certified on one of the available networks 100 or a particular network 100 may offer preferred treatment for an application, such as a particular quality of service (QOS).

Data networks 250 may include one or more networks that are external to core networks 230. In some implementations, data networks 250 may include packet data networks, such as an Internet Protocol (IP) network. In another implementation, data networks 250 may be part of one of core networks 230. Data networks 250 may provide particular network services, such as, for example, Voice-over-IP (VOIP) services, messaging services, video services, gaming services, vehicle-to-everything (V2X) services, etc.

Figure 3:
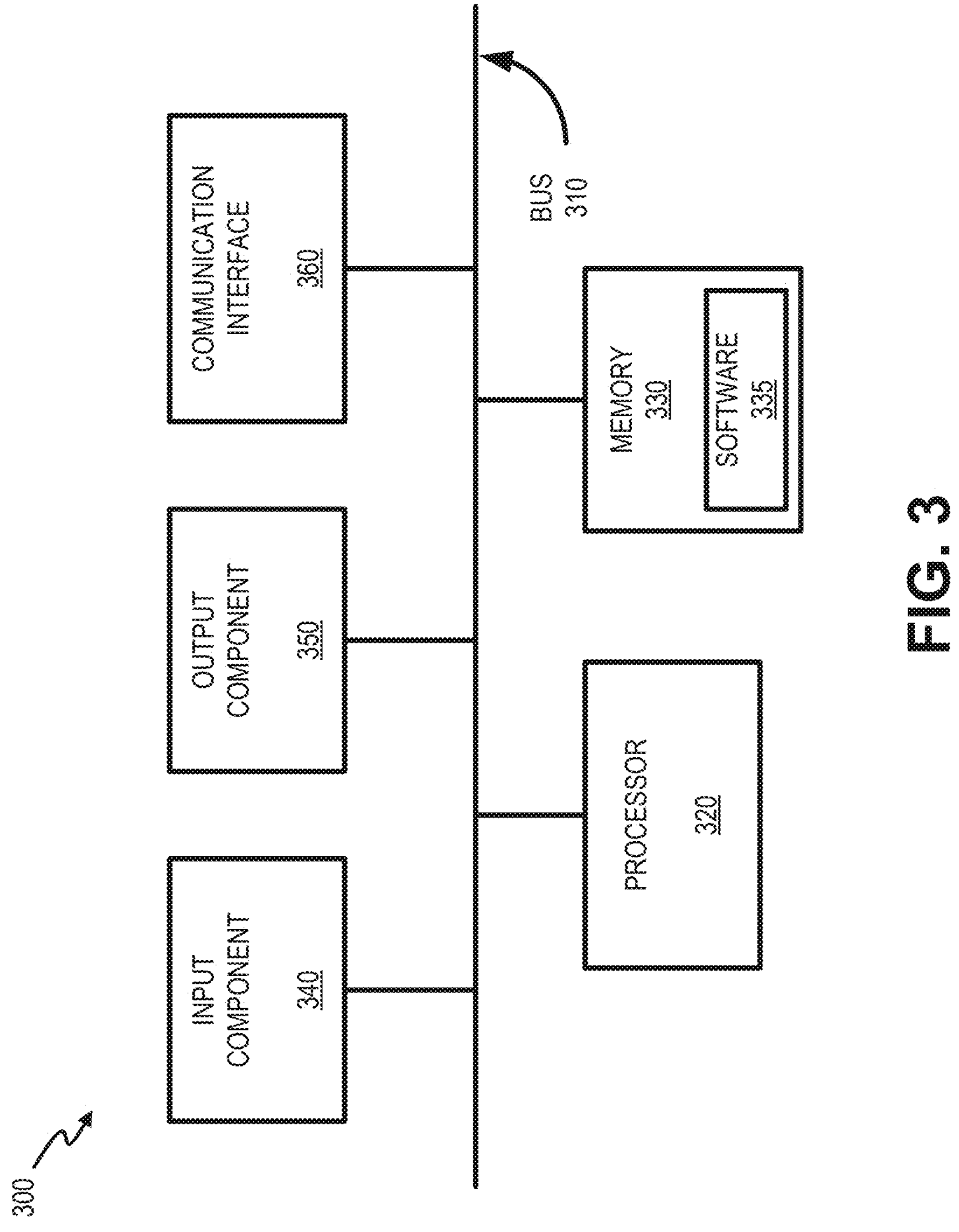
FIG. 3 depicts example components of a device described herein.

FIG. 3 is a diagram illustrating exemplary components of a device 300. Device 300 may correspond to or include, for example, UE device 110, access stations 210, core devices 240, or another component of network environments 200. Alternatively, or additionally, UE device 110, access station 210, core device 240, or the other components of network environment 200 may include one or more devices 300 and/or one or more components of device 300. Device 300 may include a bus 310, a processor 320, a memory 330 with software 335, an input component 340, an output component 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. For example, processor 320 may include one or more Central Processing Units (CPUs) and/or one or more Graphics Processing Units (GPU). In other embodiments, processor 320 may include an application-specific integrated circuit (ASIC), a field-programmable gate array (FPGA), and/or another type of integrated circuit or processing logic. Processor 320 may control operation of device 300 and its components.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 335 includes an application or a program that provides a function and/or a process. Software 335 may also include firmware, middleware, microcode, hardware description language (HDL), and/or other form of instruction. By way of example, with respect UE device 110, functional elements of UE device 110 and MDM system 245 may include software 335 to enforce a line of service to be used to route traffic for designated applications.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals. For example, if device 300 is included in UE device 110, communication interface 360 may include an antenna assembly that includes one or more antennas to transmit and/or receive RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi) card for wireless communications. Communication interface 360 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 300 may perform certain operations relating to graphical network design and configuration tools. Device 300 may perform these operations in response to processor 320 executing software instructions (e.g., software 335) contained in a computer-readable storage medium, such as memory 330. A computer-readable storage medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
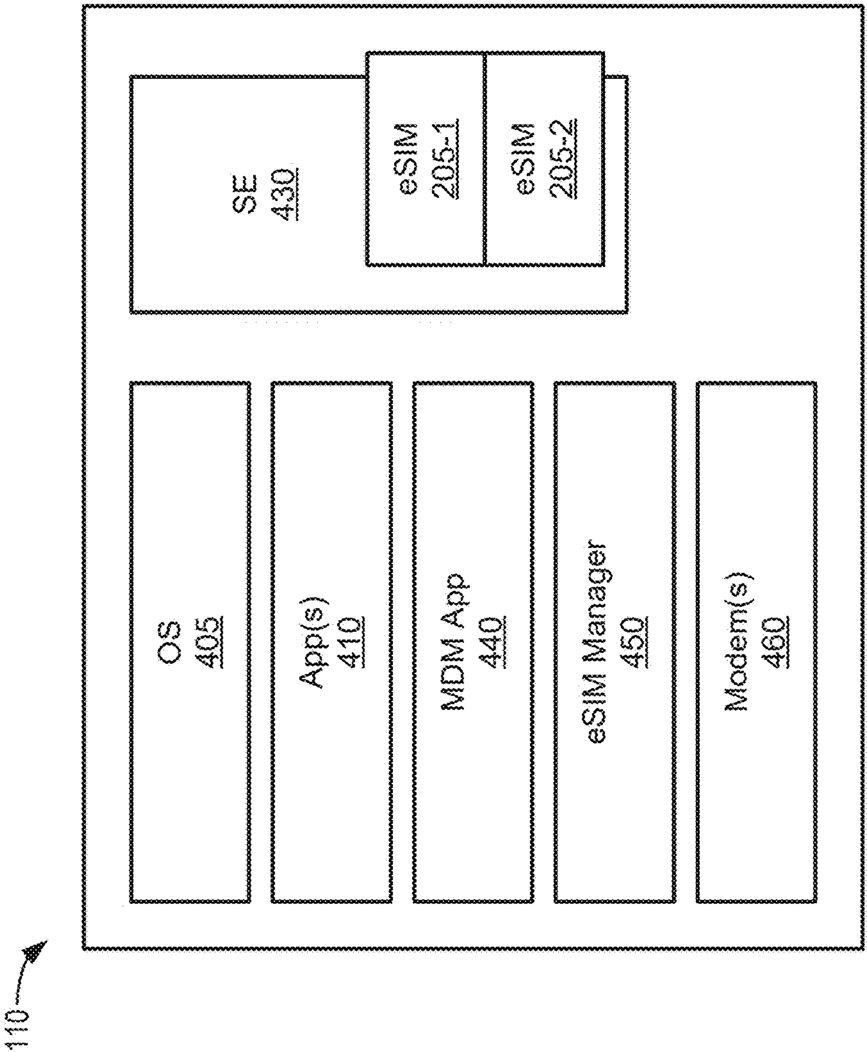
FIG. 4 is a diagram illustrating logical components of a User Equipment (UE) device, according to an implementation.

FIG. 4 is a diagram illustrating logical components of UE device 110 for selecting a line of service for an application on DSDS devices, according to implementations described herein. As shown in FIG. 4, UE device 110 may include an operating system (OS) 405, application(s) 410, a secure element (SE) 430, an MDM application (app) 440, an eSIM manager 450, and modem(s) 460.

OS 405 may, among other operations, establish a connection (e.g., an IP connection) between application 410 and modem 460 using an appropriate eSIM or other SIM-type element. In implementations described herein, OS 405 may detect when UE device 110 is operating as a DSDS device (e.g., actively using dual SIMs), extract package signatures of applications, determine (e.g., via communications to a secure element 430, eSIM 205, or MDM application 440) if the package signature is associated with a particular line of service, and initiate a network connection for application 410 through the eSIM for the corresponding line of service.

According to an embodiment, each application 410 may include logic that provides a service pertaining to a software application. For example, each application 410 may provide a business service, streaming service, gaming service, shopping service, social media service, etc., for a user of UE device 110. According to implementations described herein, application 410 may require a network connection, such as a connection to one of mobile networks 100. In some implementations, a client application 410 may be associated with an enterprise or business function, which should be limited to a particular line of service on a DSDS device. Each application 410 may include a unique package signature (also referred to as an application identifier) or other information to distinguish the application from other applications 410. The package signature may be detected/extracted by OS 405 via various methods, including use of known application programming interfaces (APIs).

SE 430 may operate independently from the rest of the UE device 110 and may include at least a processor and a secure memory protected by security keys and other protections, such as a personal identification number. For example, SE 430 may be a self-contained system including a dedicated processor and memory that are protected by one or more security layers implemented using hardware and software encryption techniques that prevent, for example, access to secured computer applications, personal account, subscriber account, financial account, security keys, and other information in the secure element memory. SE 430 may be configured in various ways. For example, an SE 430 may be embedded in UE device 110 or may be either integrated (i.e., embedded) in an UICC or into a secure digital card (e.g., a microSD card) that may be inserted into and removed from UE device 110. In other examples, SE 430 may be implemented on System-on-Chip (SOC), such as within a Trusted Execution Environment (TEE). In one implementation, SE 430 may include or access eSIMs 205.

MDM application 440 (also referred to herein as an MDM client) may interface with an MDM system 245 to store and apply policies (e.g., enterprise policies) for UE device 110. For example, a network administrator for an enterprise may set up an enterprise policy to add enterprise applications for use on a specific line of service on UE device 110. The enterprise policy may be initiated in MDM system 245-2, for example, and application package signatures to be associated with the particular line of service may be communicated to, and stored at, MDM client 440 in an MDM policy file. In one implementation, MDM client 440 may store and/or configure a package signature-to-eSIM map for UE device 110. MDM client 440 may respond, for example, to queries from OS 405 to associate an application 410 with a preferred eSIM 205.

eSIM manager 450 may store records of eSIMs 205 for use by UE device 110. For example, a user may subscribe to service from a service provider and receive an eSIM 250 in secure element 430 of UE device 110. After an eSIM 205 is stored by UE device 110, according to one implementation, eSIM manager 450 may enable a user to enable/disable an eSIM 205. For example, eSIM manager 450 may include a user interface (e.g., as shown in FIG. 1) on UE device 110 to allow a user to toggle eSIMs (e.g., eSIM 1, eSIM 2, etc.) on and off.

Modem(s) 460 may include one or more modems that performs processing, modulation, demodulation, and/or other signal processing for communications of UE device 110. According to implementations described herein, modems 460 may include a 5G/NR modem for 5G/NR communications. The 5G/NR modem may store UE Route Selection Policy (URSP) rules and/or access the URSP rules from an eSIM (e.g., eSIM A 205-1, eSIM B 205-2, etc.) or another secure element (not shown) of UE device 110. In one implementation, modem 460 may apply URSP rules to set up a communication session, such as a protocol data unit (PDU) session, for an application 410.

Although FIG. 4 shows exemplary logical components of UE device 110, in other implementations, UE device 110 may include fewer components, different components, differently arranged components, or additional components than depicted in FIG. 4. In addition, functions described as being performed by one of the logical components in FIG. 4 may alternatively be performed by another one or more of the components of UE device 110.

Figure 5A:
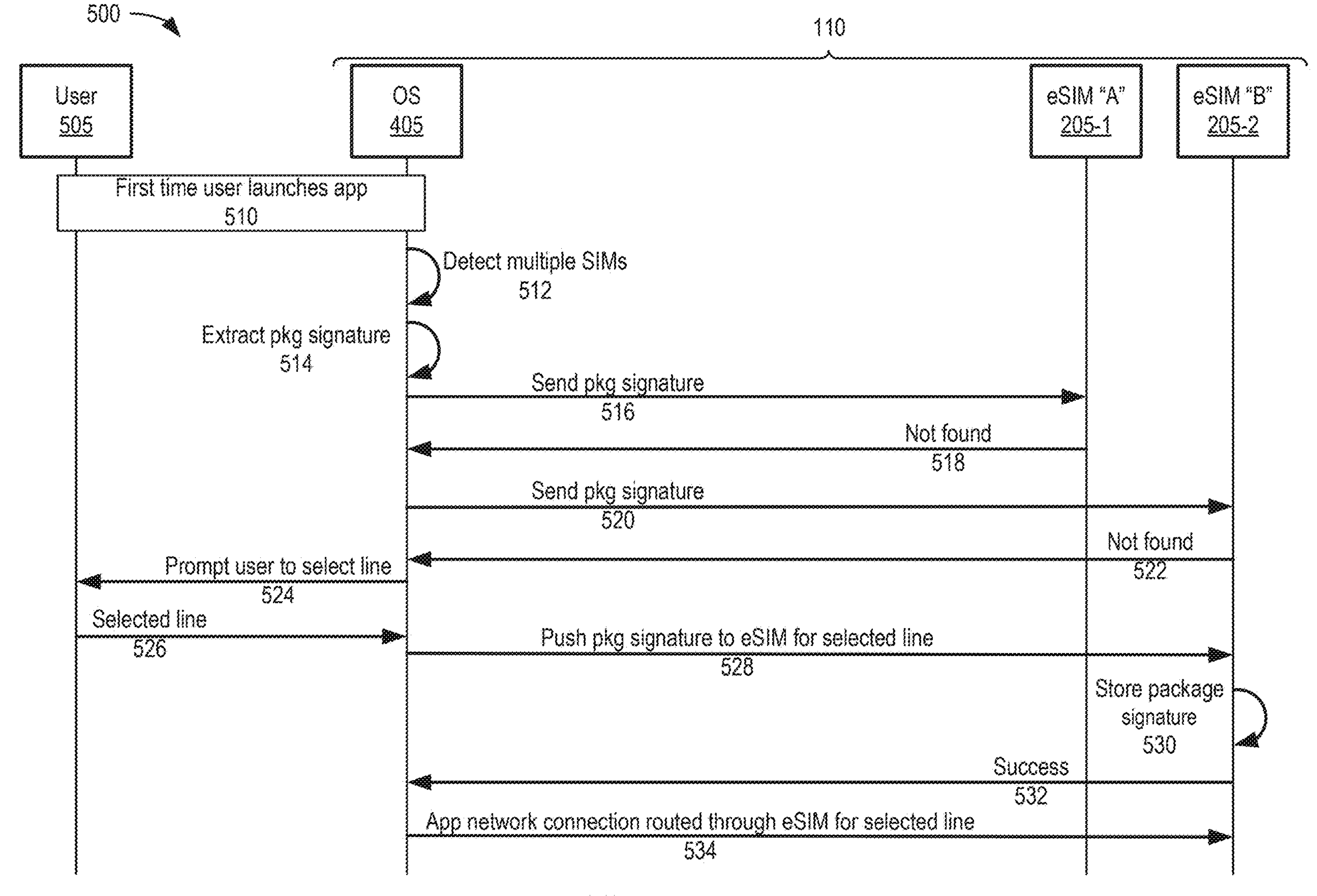
FIGS. 5A and 5B are signal flow diagrams illustrating communications for implementing application line selection for a Dual SIM Dual Standby (DSDS) device, according to an implementation.
Figure 5B:
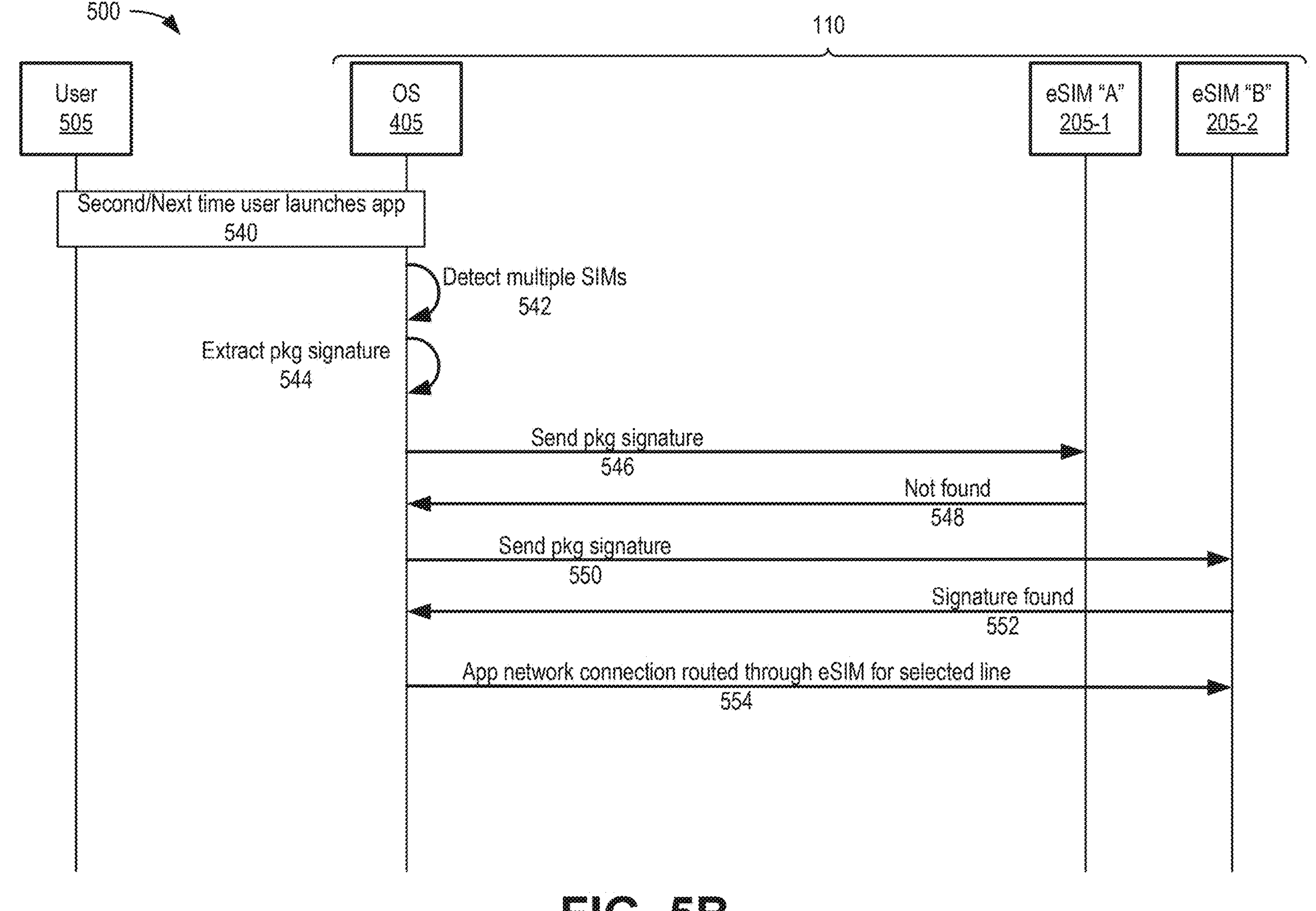

FIGS. 5A and 5B are signal flow diagrams illustrating communications for implementing application line selection for DSDS devices in a portion 500 of network environment 200. FIGS. 5A and 5B illustrate a use case where a user is able to select the line of service used to route traffic for a selected application. Environment portion 500 may include a user 505 using user device 110 with OS 405, eSIM 205-1, and eSIM 205-2. FIGS. 5A and 5B provide simplified illustrations of communications in environment 500 and are not intended to reflect every signal or communication exchanged between devices.

As shown in FIG. 5A, user 505 may launch or execute 510 for the first time (e.g., after an application is installed or after initiating a subscription) an application (e.g., application 410) on UE device 110. The application may require, for example, a network session using a mobile network, such as to facilitate an Internet connection. OS 405 may detect 512 multiple SIMs are available on UE device 110. Each application available to UE device 110 may have a package signature (e.g., unique identifier for the application) that may be identified by OS 405. For example, the package signature may be included in an Android Package Kit (APK) file for ANDROID operating systems, in an IPA file for APPLE IOS, or in a file for another type of OS. OS 405 may extract 514 the package signature for the launched application. In one implementation, the package signature may be retrieved using a standardized API for retrieving such signatures.

OS 405 may send at 516 the package signature to eSIM 205-1. Since the application has not been previously launched/executed on UE device 110, eSIM 205-1 will not have any record associated with the package signature. Accordingly, eSIM 205-1 will reply to OS 405 with a package signature not found response 518. OS 405 may also send 520 the package signature to eSIM 205-2. Similar to eSIM 205-1, eSIM 205-2 will not have any record associated with the package signature. Accordingly, eSIM 205-2 will reply to OS 405 with a package signature not found response 522.

Figure 6:
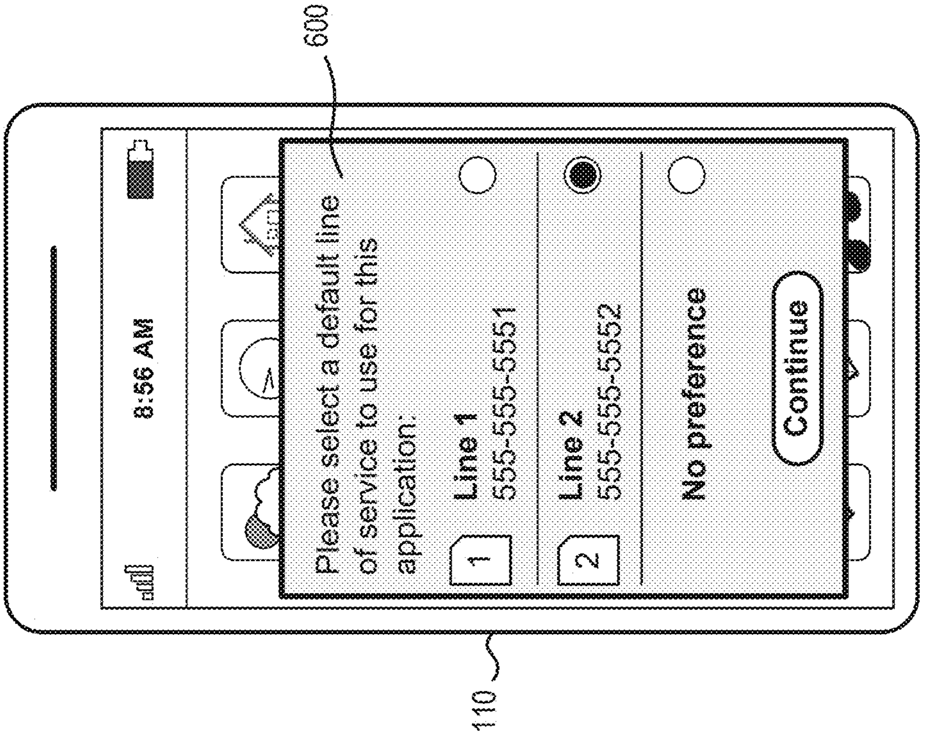
FIG. 6 is an example user interface to select a line of service for an application, according to an implementation.

In response to signals 518 and 522, OS 405 may provide a prompt 524 to user 505 to select a line of service for the application. In one implementation, prompt 524 may be provided via a graphical user interface on a screen of UE device 110. Prompt 524 may provide a listing of available lines to service the launched application and request user input. FIG. 6 provides an example of a user interface 600 to perform prompt 524. Assume, as shown by the darkened circle in FIG. 6, a user selects 526 Line 2 in response to prompt 524.

OS 405 may receive the line selection 526 and, in response, may push 528 the package signature of the application to the eSIM associated with the user's selected line of service, eSIM 205-2 (e.g., associated with selected Line 2). Signaling of push message 528 to eSIM 205-2 is shown as a single line for simplicity. In other implementations, sending a package signature to a selected eSIM 205 may include a series of local communications and/or remote signals from core devices 240 (e.g., an over-the-air server) to update, for example, a URSP rule.

The package signature may be stored 530 by the selected eSIM 205 (e.g., eSIM 205-2). Once the package signature is successfully stored by eSIM 205-2, eSIM 205-2 may send a success signal 532 to OS 405, indicating that the package signature for the application is registered with eSIM 205-2. OS 405 may receive the success indication and route 534 the network connection or session for the launched application through eSIM 205-2.

Turning to FIG. 5B, user 505 may launch or execute 540 for a second or subsequent time (e.g., any launch after the first time the application is launched) the application on UE device 110. OS 405 may again detect 542 multiple SIMs are available on UE device 110 and extract 544 the package signature for the launched application.

OS 405 may send 546 the package signature to eSIM 205-1, which will not have any record associated with the package signature. Accordingly, eSIM 205-1 will reply to OS 405 with a package signature not found response 548. OS 405 may also send 550 the package signature to eSIM 205-2, which will have stored the package signature previously provided via signal 528. Accordingly, eSIM 205-2 will reply to OS 405 with a package signature found signal 552. OS 405 may receive the success indication and route 554 the network connection or session for the launched application through eSIM 205-2.

In a multi-SIM scenario with three or more lines of service, and where a previously-designated eSIM (e.g., eSIM 205-2) is not currently active on a DSDS device, OS 405 would send the package signature to each of the active eSIMs and receive package signature not found responses (e.g., similar to responses 518 and 522 above). Accordingly, OS 405 would again prompt a user to select an active eSIM 205 for the application, as described above in connection with FIG. 5A. The user may provide a new eSIM designation for the application via the user prompt or, alternatively, choose to activate the previously designated eSIM (e.g., eSIM 205-2).

Figure 7A:
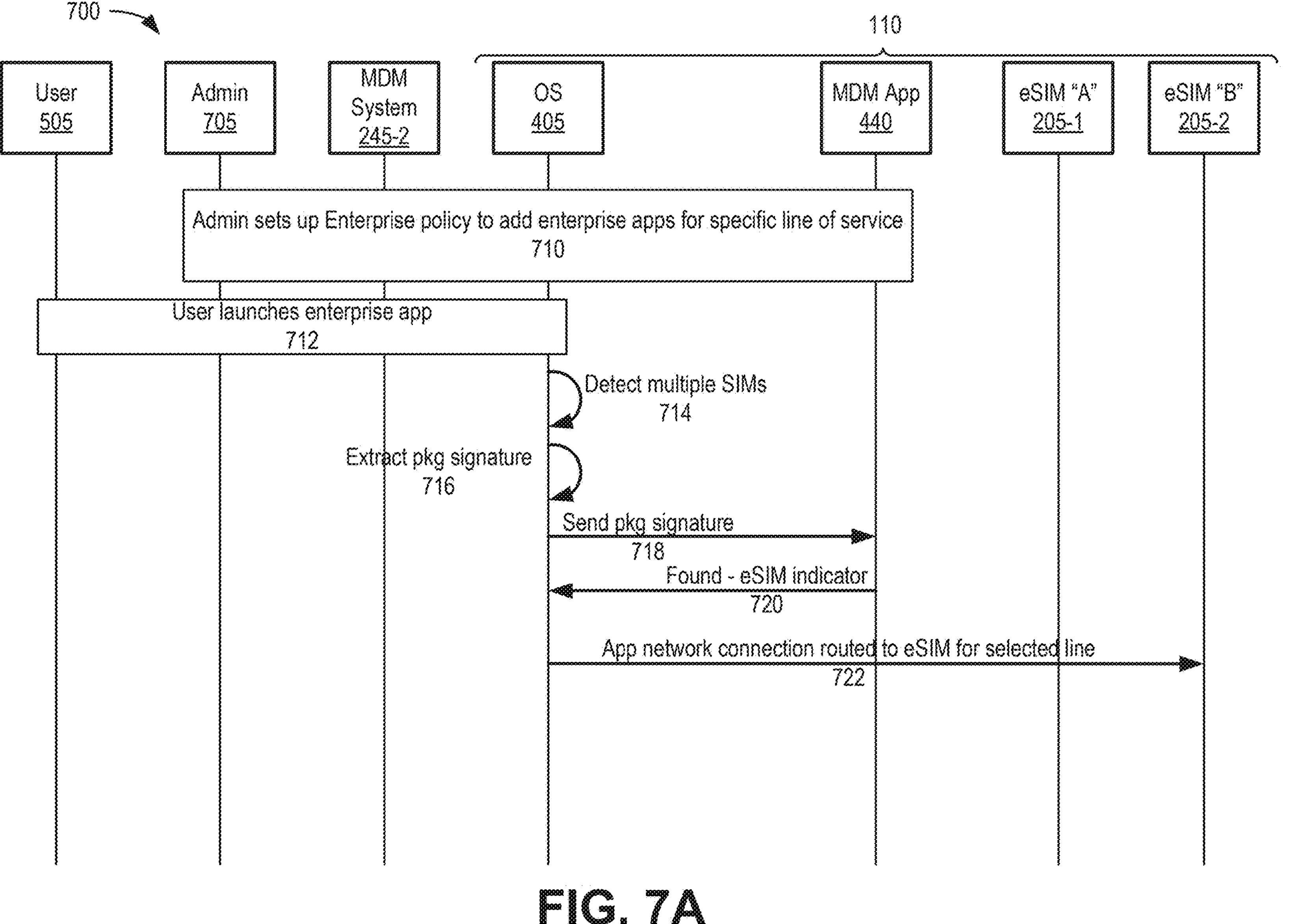
FIGS. 7A and 7B are signal flow diagrams illustrating communications for implementing application line selection for a DSDS, according to another implementation.
Figure 7B:
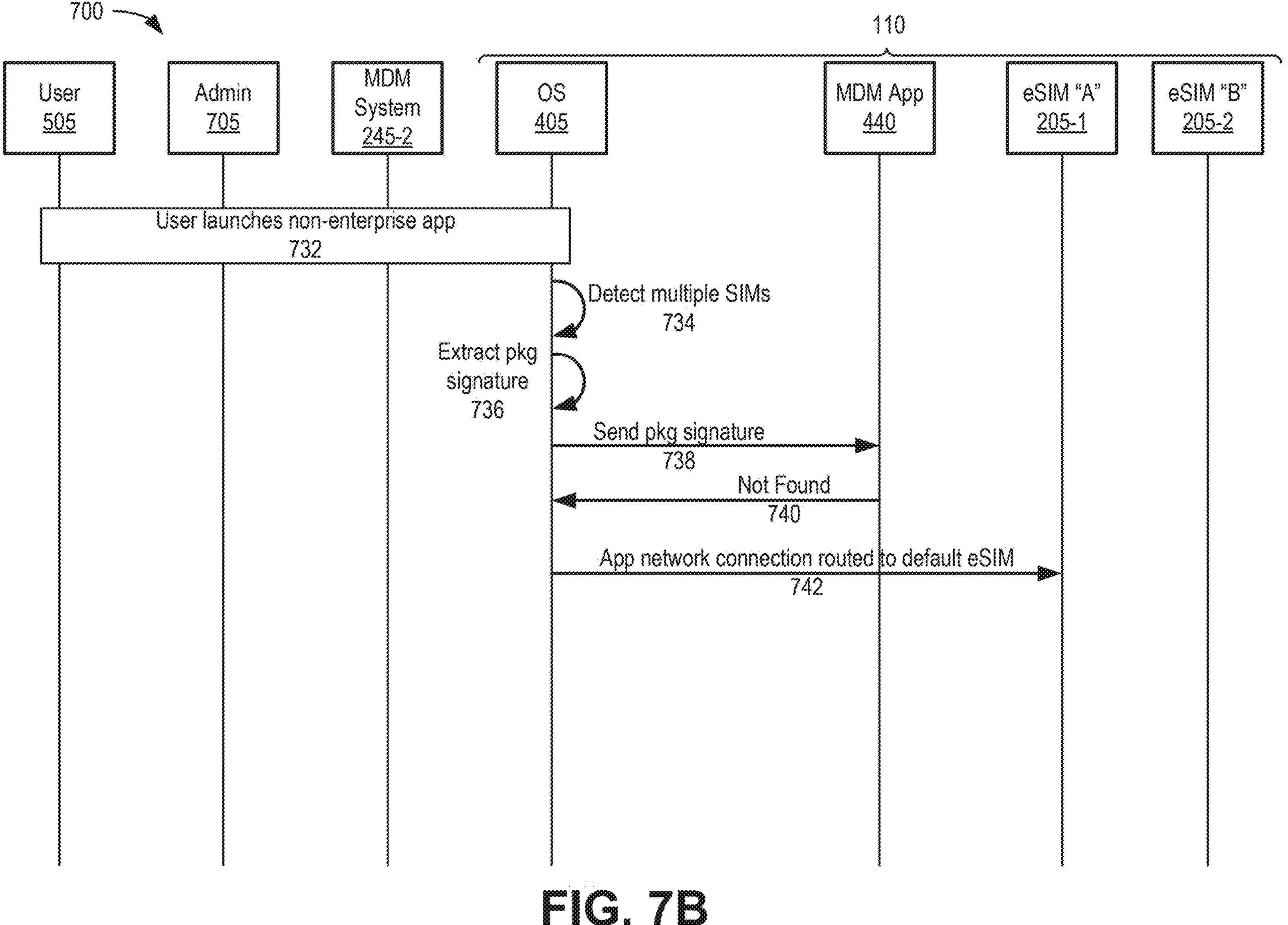

FIGS. 7A and 7B are signal flow diagrams illustrating communications for implementing application line selection for DSDS devices in a portion 700 of network environment 200. FIGS. 7A and 7B illustrate a use case where an administrator (e.g., of an enterprise network) selects the line of service used to route traffic for selected applications. Environment portion 700 may include user 505 using user device 110, an administrator 705, and MDM system 245-2. UE device 110 may include OS 405, MDM client 440, eSIM 205-1, and eSIM 205-2. FIGS. 7A and 7B provide simplified illustrations of communications in environment 700 and are not intended to reflect every signal or communication exchanged between devices.

As shown in FIG. 7A, network administrator 705 for an enterprise may set up 710 an enterprise policy to add enterprise applications for a specific line of service. The enterprise policy may include which applications will use a specific line of service. In the illustration of FIGS. 7A and 7B, assume eSIM 205-2 is associated with the line of service to support enterprise applications for UE device 110, while eSIM 205-1 is the default policy (e.g., for non-specified applications). The enterprise policy may be initiated in MDM system 245-2, for example, and application package signatures associated with eSIM 205-2 may be communicated to and stored at MDM client 440 in an MDM policy file (e.g., as a package signature-to-eSIM map).

After configuration of the enterprise policy, user 505 may launch 712 an enterprise application on UE device 110. OS 405 may detect 714 that multiple SIMs are available on UE device 110. As described above in the context of FIG. 5A, OS 405 may extract 716 the package signature for the launched application.

OS 405 may send 718 the package signature to MDM client 440, which will have previously stored the package signature-to-eSIM map previously provided during setup 710. Accordingly, MDM client 440 will reply to OS 405 with a package signature found signal 720 that indicates the appropriate eSIM (e.g., eSIM 205-2) for the launched enterprise application. OS 405 may receive the success indication and route 722 the network connection for the launched application through eSIM 205-2.

In a multi-SIM scenario with three or more lines of service, and where the MDM system-designated eSIM (e.g., eSIM 205-2) is not currently active on UE device 110, OS 405 may prompt a user to activate the eSIM designated in package signature found signal 720 (e.g., eSIM 205-2). The user prompt (not shown) may require the user to activate the designated eSIM prior to OS 405 initiating the network connection (e.g., via signal 722).

Referring to FIG. 7B, after configuration of the enterprise policy, user may launch 732 a non-enterprise application (e.g., an application for personal use) on UE device 110. OS 405 may again detect 734 that multiple SIMs are available on UE device 110 and extract 736 the package signature for the launched non-enterprise application.

OS 405 may also send 738 the package signature to MDM client 440. Since the package signature for the non-enterprise application will not have been stored in the package signature-to-eSIM map provided during setup 710, MDM client 440 will reply to OS 405 with a package signature not found signal 740. OS 405 may receive the not found signal and, in response, route 742 the network connection for the launched application through the primary SIM (e.g., eSIM 205-1) as designated in the cellular settings for UE device 110.

Figure 8A:
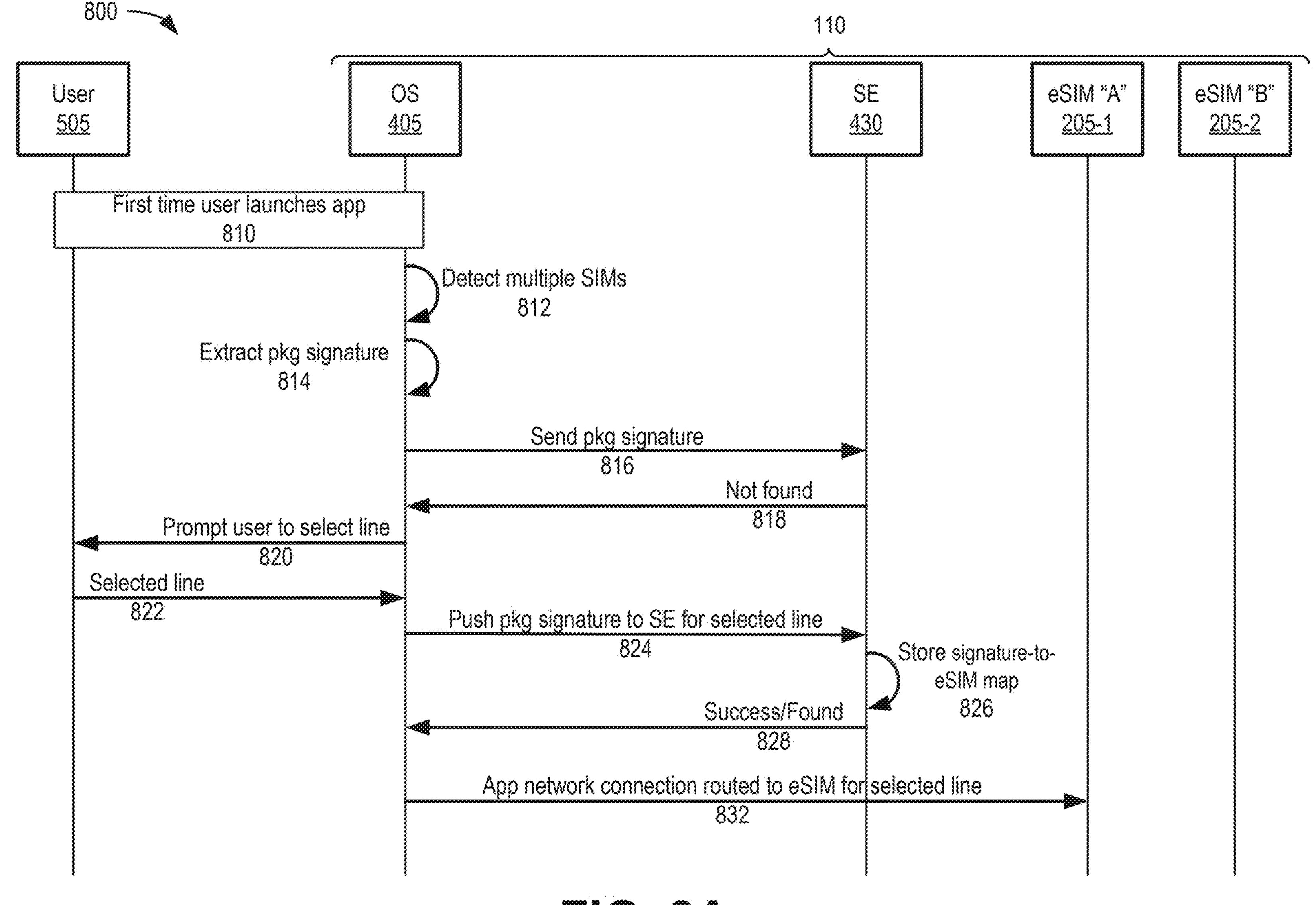
FIGS. 8A and 8B are signal flow diagrams illustrating communications for implementing application line selection for a DSDS, according to still another implementation.
Figure 8B:
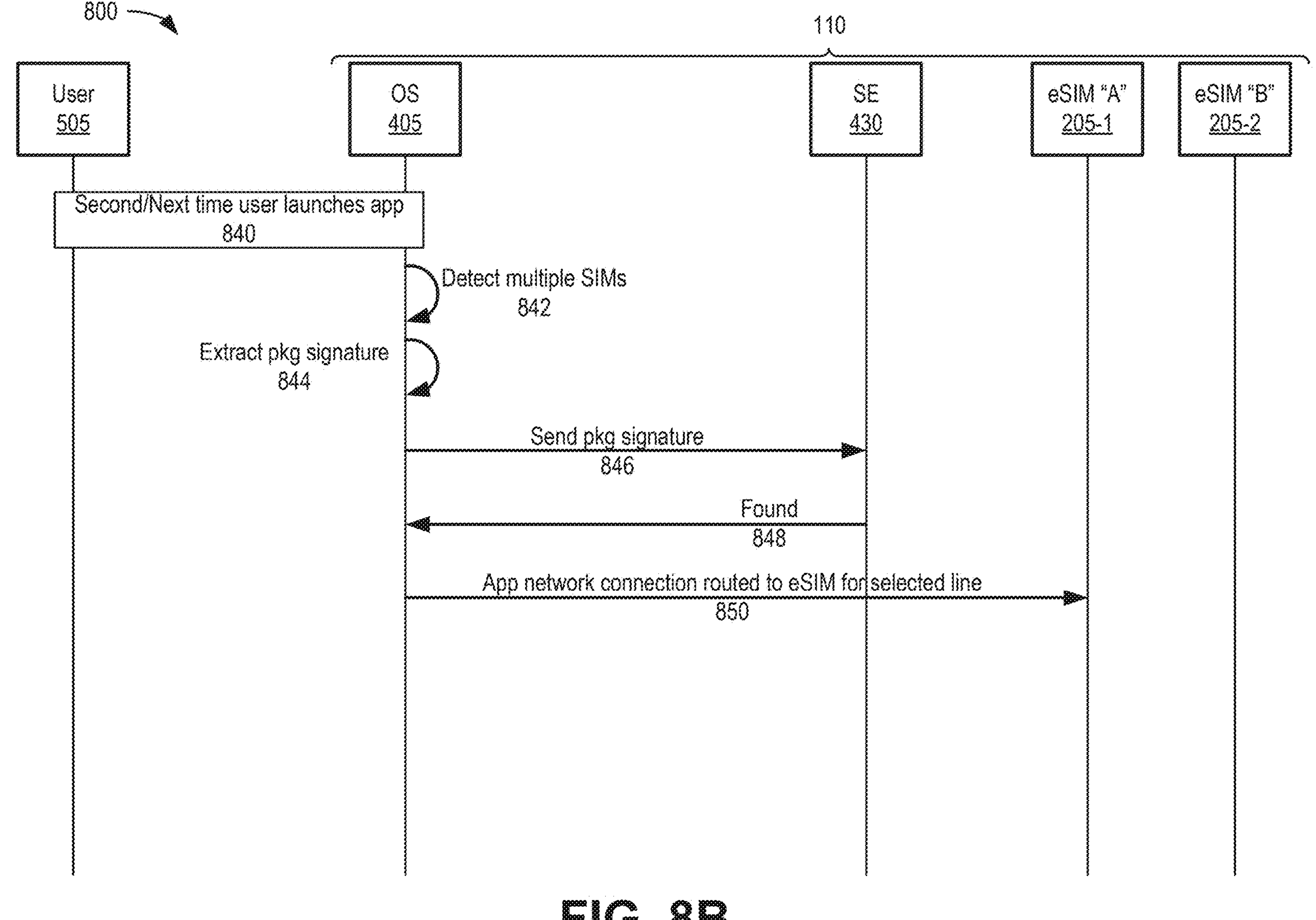

FIGS. 8A and 8B are signal flow diagrams illustrating communications for implementing application line selection for DSDS devices in a portion 800 of network environment 200. FIGS. 8A and 8B illustrate another use case where a user is able to select the line of service used to route traffic for a selected application. Environment portion 800 may include user 505 using user device 110. UE device 110 may include OS 405, secure element 430, eSIM 205-1, and eSIM 205-2. FIGS. 8A and 8B provide simplified illustrations of communications in environment 800 and are not intended to reflect every signal or communication exchanged between devices.

As shown in FIG. 8A, user 505 may launch 810 for the first time (e.g., after an application is installed or after initiating a subscription) an application on UE device 110. OS 405 may detect 812 that multiple SIMs are available on UE device 110. As described above in the context of FIG. 5A, OS 405 may extract 814 the package signature for the launched application.

OS 405 may send 816 the package signature to SE 430. Since the application has not been previously launched on UE device 110, SE 430 may not have any record associated with the package signature. Accordingly, SE 430 will reply to OS 405 with a package signature not found response 818. In response to signal 818, OS 405 may provide a prompt 820 to user 505 to select a line of service for the application. In one implementation, prompt 820 may correspond to user interface 600 described above. Assume, user 505 selects 822 Line 1, associated with eSIM 205-1, in response to prompt 820.

OS 405 may receive the line selection 822 and, in response, may push 824 the package signature of the application and eSIM association to SE 430. Signaling of push message 824 to SE 430 is shown as a single line for simplicity. In other implementations, sending a package signature-to-eSIM association may include a series of local communications and/or remote signals from core devices 240 (e.g., an over-the-air server) to update, for example, a UE Route Selection Policy (URSP) rule.

The package signature-to-eSIM map may be stored 826 by SE 430. Once the package signature is successfully stored, SE 430 may send a success signal 828 with the eSIM identifier (e.g., for eSIM 205-1) to OS 405, indicating that the package signature for the application is registered with eSIM 205-1. OS 405 may receive the success indication and route 832 the network connection for the launched application through eSIM 205-1.

Referring to FIG. 8B, user 505 may launch 840 for a second or subsequent time the application on UE device 110. OS 405 may again detect 842 multiple SIMs are available on UE device 110 and extract 844 the package signature for the launched application.

OS 405 may send 846 the package signature to SE 430, which will have stored the package signature-to-eSIM map previously indicated via signal 824. Accordingly, SE 430 will reply to OS 405 with a package signature found signal 848, including the eSIM identifier for eSIM 205-1. OS 405 may receive found signal 848 and route 850 the network connection for the launched application through eSIM 205-1.

Figure 9:
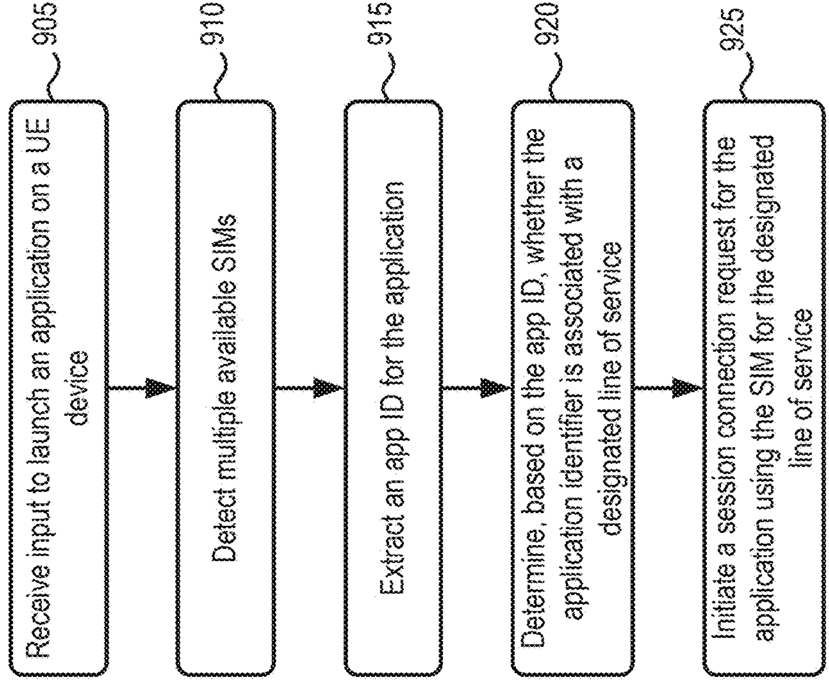
FIGS. 9 and 10 are flow diagrams illustrating processes for enabling association of an applications with a line of service on a DSDS device, according to implementations described herein.
Figure 9:
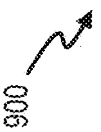
Figure 10:
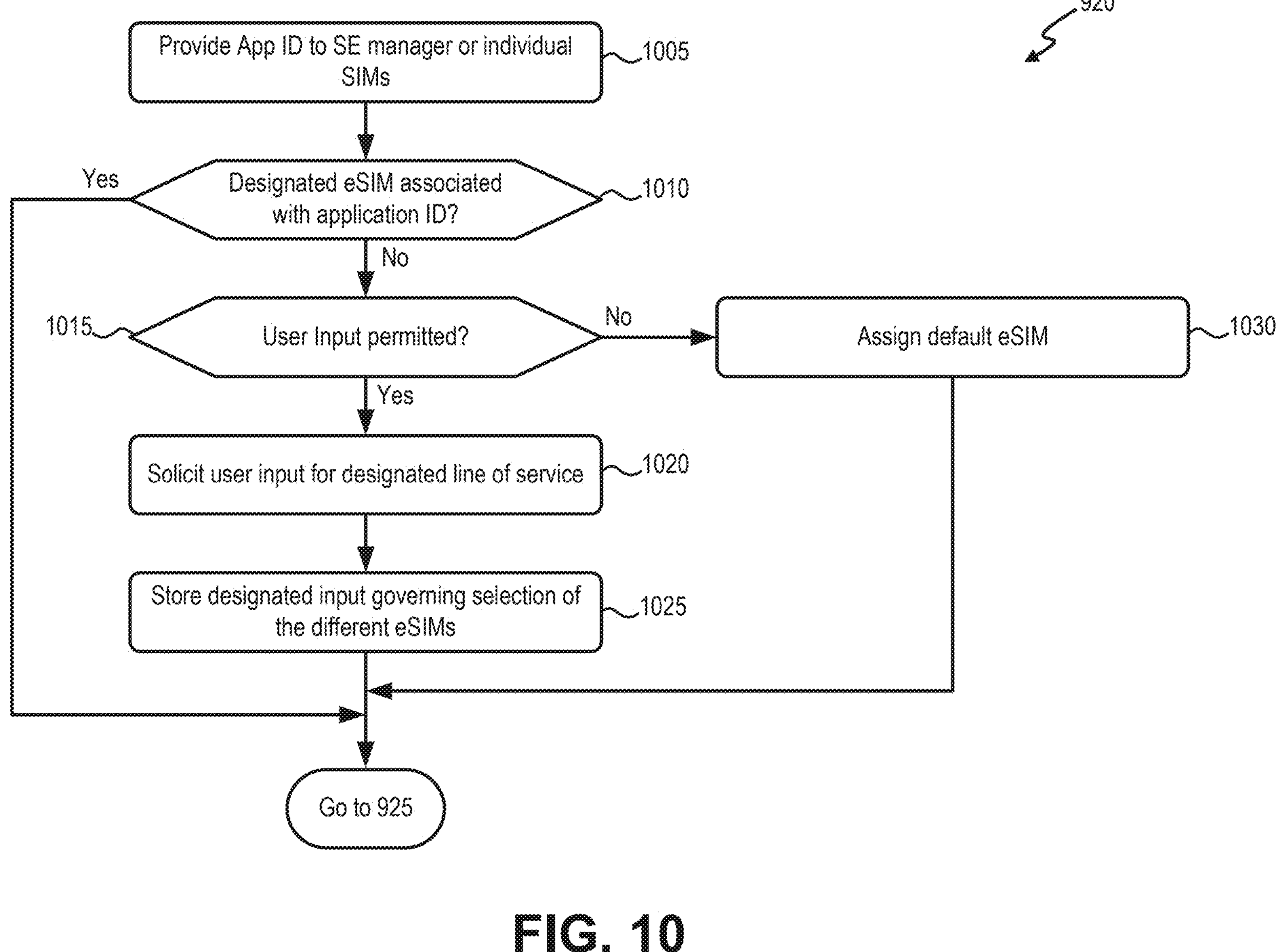

FIGS. 9 and 10 are flows diagram illustrating a process 900 for enabling association of an applications with a line of service on a DSDS device. In one implementation, process 900 may be implemented by UE device 110. In another implementation, process 900 may be implemented by UE device 110 in conjunction with one or more other devices in network environment 200, such as MDM system 245.

Process 900 may include receiving input to launch an application on a UE device (block 905). For example, a user may launch application 410. In another implementation, application 410 may be launched upon a startup operation for UE device 110.

Process 900 may further include detecting multiple available eSIMs (block 910) and extracting an application identifier for the application (block 915). For example, OS 405 on UE device 110 may detect that multiple SIMs are available on UE device 110. OS 405 may extract the package signature (e.g., an application identifier) for the launched application.

Process 900 may also include determining, based on the application identifier, whether the application is associated with a designated line of service (block 920) and initiating a session connection request for the application using the SIM for the designated line of service (block 925). For example, depending on the implementation, OS 405 may query individual SIMs 205, SE 430, or MDM client 440 to determine if application 410 has been designated for a particular line of service/eSIM. Process block 920 is described further in connection with FIG. 10. Once the designated line of service has been determined, OS 405 may initiate a network connection and/or session request using the eSIM 205 for the designated line of service.

Process block 920 may include the process blocks shown in FIG. 10 in an exemplary implementation. Referring to FIG. 10, process block 920 may include providing an application ID to an SE manager or individual SIMs (block 1005) and determining if there is a designated SIM associated with the application identifier (block 1010). For example, if UE device 110 is configured to allow a user to select the line of service used to route traffic for a selected application, operating system 405 may send a package signature for the application to individual SIMs 205, as shown in FIG. 5A. If an administrator (e.g., of an enterprise network) controls selecting the line of service used to route traffic for selected applications, operating system 405 may send the package signature to MDM client 440, as shown in FIG. 7A. If UE device 110 is configured with a SE manager 430 and allows a user to select the line of service, operating system 405 may send the package signature to SE 430, as shown in FIG. 8A. Operating system 405 may await a response to determine if any of SIMs 205, SE 430, or MDM client 440 have a record of the package signature.

If there is not a designated eSIM associated with the application identifier (block 1010—No), process block 920 may also include determining if user input is permitted (block 1015). For example, if the application is not currently assigned to a particular eSIM 205, OS 405 may determine if user input to select a line of service is enabled or permitted.

If user input is permitted (block 1015—Yes), process block 920 may include soliciting user input for a designated line of service (block 1020) and storing the user input designating selection of a SIM (block 1025). For example, operating system 405 may present user interface 600 to prompt a user to designate a line of service associated with the selected application. Operating system 405 may receive the user input and forward the application/line associated to the appropriate SIMs 205, SE 430, or MDM client 440.

If user input is not permitted (block 1015—No), process block 920 may include assigning a default SIM (block 1030). For example, operating system 405 may assign a default SIM for the application when MDM client 440 does not have a package signature for the application stored in memory and no user input option is available.

If the policy rule points to a designated eSIM associated with the application identifier (block 1010—Yes) or after a default SIM is assigned (block 1030), process block 920 may proceed to process block 925 as described in connection with FIG. 9.

Systems and methods described herein enable association of particular applications with a line of service on DSDS devices. A UE device receives a command to launch an application that requires a mobile network connection. The UE device detects multiple available SIMs, wherein each of the multiple available SIMs is associated with a different line of service. The UE device extracts an application identifier for the application, and determines, based on the application identifier, that the application is associated with a designated line of service. The UE devices initiates a session connection request for the application using a SIM, of the multiple available SIMs, associated with the designated line of service.

The foregoing description of embodiments provides illustrations but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive. For example, while designated lines of service are primarily described for DSDS devices, in other implementations, applications may be similarly assigned to a line of service on UE devices configured with more than two active SIMs.

In addition, while series of blocks have been described with regard to the processes illustrated in FIGS. 9 and 10, and series of signals with respect to FIGS. 5A-8B the order of the blocks and/or signals may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 320, etc.), or a combination of hardware and software. The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 320) of a computational device. A non-transitory storage medium includes one or more of the storage mediums described in relation to memory 330.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method, comprising:

storing, by a user equipment (UE) device, one or more first application identifiers on a first subscriber identity module (SIM) of multiple available SIMs and one or more second application identifiers on a second SIM of the multiple available SIMs;

receiving, by the UE device, input to execute an application that requires a mobile network connection;

detecting, by the UE device, the multiple available SIMS, wherein each of the multiple available SIMs is associated with a different line of service;

extracting, by an operating system of the UE device and based on the receiving, an application identifier for the application;

sending, by the operating system, the application identifier to the first SIM and the second SIM;

determining, by the operating system and based on responses to sending the application identifier, that the application is associated with the first SIM; and initiating, by the UE device, a session connection request for the application using the first SIM, associated with a designated line of service.

2. The method of claim 1, wherein the application identifier is included in a package signature for the application.

3. The method of claim 2, wherein the extracting further comprises:

retrieving the package signature via a standardized application programming interface (API).

4. The method of claim 1, wherein the determining comprises:

sending, by the operating system of the UE device, the application identifier to the first SIM and the second SIM, prior to the storing;

receiving, by the operating system, signals indicating that none of the first SIM and the second SIM stores the application identifier; and prompting, by the UE device, a user to provide the designated line of service for the application when none of the first SIM and the second SIM stores the application identifier.

5. The method of claim 4, wherein the determining further comprises:

sending, by the operating system, the application identifier to the first SIM to associate the application identifier with the designated line of service.

6. The method of claim 4, wherein the determining further comprises:

storing, by the first SIM associated with the designated line of service, the application identifier.

7. The method of claim 1, further comprising:

responding, by the first SIM and to sending the application identifier, with a package signature not found signal; and responding, by the second SIM and to sending the application identifier, with a package signature not found response.

8. The method of claim 1, further comprising:

sending, by the operating system, the application identifier to a third SIM of the multiple available SIMs.

9. The method of claim 1, wherein the second SIM is associated with a default line of service.

10. A user equipment (UE) device comprising:

one or more processors configured to:

store one or more first application identifiers on a first subscriber identity module (SIM) of multiple available SIMs and one or more second application identifiers on a second SIM of the multiple available SIMs;

receive a command to execute an application that requires a mobile network connection;

detect the multiple available SIMS, wherein each of the multiple available SIMs is associated with a different line of service;

extract, based on the receiving, an application identifier for the application;

send the application identifier to the first SIM and the second SIM;

determine, based on responses to sending the application identifier, that the application is associated with the first SIM; and initiate, by the UE device, a session connection request for the application using the first SIM, associated with a designated line of service.

11. The UE device of claim 10, wherein the application identifier is included in a package signature for the application.

12. The UE device of claim 11, wherein, when extracting the application identifier, the one or more processors are further configured to:

retrieve the package signature via a standardized application programming interface (API).

13. The UE device of claim 10, wherein, when determining that the application is associated with a designated line of service, the one or more processors are further configured to:

send, by an operating system of the UE device, the application identifier to the first SIM and the second SIM, prior to the storing;

receive, by the operating system, signals indicating that none of the first SIM and the second SIM stores the application identifier; and prompt a user to provide the designated line of service for the application when none of the first SIM and the second SIM stores the application identifier.

14. The UE device of claim 13, wherein, when determining that the application is associated with the first SIM, the one or more processors are further configured to:

send, by the operating system, the application identifier to a SIM, of the multiple available SIMs, to associate the application identifier with the designated line of service.

15. The UE device of claim 10, wherein, when determining that the application is associated with the first SIM, the one or more processors are further configured to:

store, by the first SIM associated with the designated line of service, the application identifier.

16. The UE device of claim 10, wherein the one or more processors are further configured to:

respond, by the first SIM and to sending the application identifier, with a package signature not found signal; and respond, by the second SIM and to sending the application identifier, with a package signature not found response.

17. The UE device of claim 16, wherein the one or more processors are further configured to:

send the application identifier to a third SIM of the multiple available SIMs.

18. A non-transitory computer-readable medium containing instructions executable by at least one processor of a user equipment (UE) device, the non-transitory computer-readable medium comprising one or more instructions for:

storing one or more first application identifiers on a first subscriber identity module (SIM) of multiple available SIMs and one or more second application identifiers on a second SIM of the multiple available SIMs;

receiving input to execute an application that requires a mobile network connection;

detecting the multiple available SIMS, wherein each of the multiple available SIMs is associated with a different line of service;

extracting, based on the receiving, an application identifier for the application;

sending the application identifier to the first SIM and the second SIM;

determining, based on responses to sending the application identifier, that the application is associated with the first SIM; and initiating a session connection request for the application using the first SIM, associated with a designated line of service.

19. The non-transitory computer-readable medium of claim 18, further comprising one or more instructions for:

responding, by the first SIM and to sending the application identifier, with a package signature not found signal; and responding, by the second SIM and to sending the application identifier, with a package signature not found response.

20. The non-transitory computer-readable medium of claim 18, wherein the instructions for extracting the application identifier further comprises one or more instructions for:

retrieving a package signature including the application identifier via a standardized application programming interface (API).

* * * * *